(12) United States Patent
Nemoto et al.

(10) Patent No.: US 8,553,234 B2
(45) Date of Patent: Oct. 8, 2013

(54) SHAPE MEASUREMENT DEVICE (75) Inventors: Kentaro Nemoto, Kawasaki (JP);
Masaoki Yamagata, Kawasaki (JP);
Tadashi Iwamoto, Hino (JP);
Nobuyoshi Machida, Kawasaki (JP)

(73) Assignee: Mitutoyo Corporation, Kanagawa (JP)

( * ) Notice: Subject to any disclaimer, the term of this patent is extended or adjusted under 35 U.S.C. 154(b) by 35 days.

(21) Appl. No.: 13/425,504

(22) Filed: Mar. 21, 2012

(65) Prior Publication Data
US 2012/0262726 A1 Oct. 18, 2012

(30) Foreign Application Priority Data
Apr. 18, 2011 (JP) ................................. 2011-091731

(51) Int. Cl.
*G01B 11/24* (2006.01)
(52) U.S. Cl.
USPC ........................... 356/601; 356/602; 356/623
(58) Field of Classification Search
USPC ................................................. 356/601–623
See application file for complete search history.

(56) References Cited

U.S. PATENT DOCUMENTS

| | | | |
|---|---|---|---|
| 5,076,698 A * | 12/1991 | Smith et al. .................... | 356/602 |
| 6,268,918 B1 | 7/2001 | Tanabe et al. | |
| 7,616,328 B2 * | 11/2009 | Stern et al. .................... | 356/623 |
| 2002/0180988 A1* | 12/2002 | Johnston et al. ............... | 356/602 |
| 2003/0071194 A1 | 4/2003 | Mueller et al. | |
| 2007/0097381 A1 | 5/2007 | Tobiason et al. | |
| 2008/0137103 A1* | 6/2008 | Torii et al. .................... | 356/622 |
| 2012/0307260 A1* | 12/2012 | Keshavmurthy et al. ..... | 356/610 |

FOREIGN PATENT DOCUMENTS

JP    2009-534969    9/2009

OTHER PUBLICATIONS

E.P.O. Search report, mailed Aug. 17, 2012.
U.S. Appl. No. 13/425,762 to Kentaro Nemoto et al., filed Mar. 21, 2012.

* cited by examiner

*Primary Examiner* — Hoa Pham
(74) *Attorney, Agent, or Firm* — Greenblum & Bernstein P.L.C.

(57) ABSTRACT

Disclosed is a shape measurement device including: a light irradiation unit which irradiates linear light onto a work; an imaging element which images reflected light reflected by the work; and an image-forming lens which forms an image of the reflected light reflected by the work on an imaging plane of the imaging element, and a light irradiation plane of the light irradiation unit, a principal plane including a principal point of the image-forming lens, and the imaging plane of the imaging element satisfy a Scheimpflug principle. The shape measurement device further includes: an image obtaining region selection unit which divides the imaging plane of the imaging element into a plurality of regions, and selects, as an image obtaining region, a region for use in measurement from the plurality of regions in response to at least one of measurement accuracy and a size of a measurement range.

2 Claims, 7 Drawing Sheets

SHAPE MEASUREMENT DEVICE

CROSS-REFERENCE TO RELATED APPLICATIONS

This application is based upon and claims the benefit of priority from the prior Japanese Patent Application No. 2011-091731, filed on Apr. 18, 2011, the entire contents of which are incorporated herein by reference.

BACKGROUND OF THE INVENTION

1. Field of the Invention

The present invention relates to a shape measurement device.

2. Background Art

Heretofore, a shape measurement device has been known, which scans a surface of a work, that is referred to as an object to be measured, by a probe in a noncontact manner, and measures a shape of the surface of the work (for example, refer to Japanese Translation of PCT International Application Publication No. JP-T-2009-534969).

The probe is composed by including an imaging element such as a charge coupled device (CCD) and a complementary metal oxide semiconductor (CMOS), an image-forming lens, a line laser, and the like, and performs the measurement by using the Scheimpflug principle.

Figure 6:
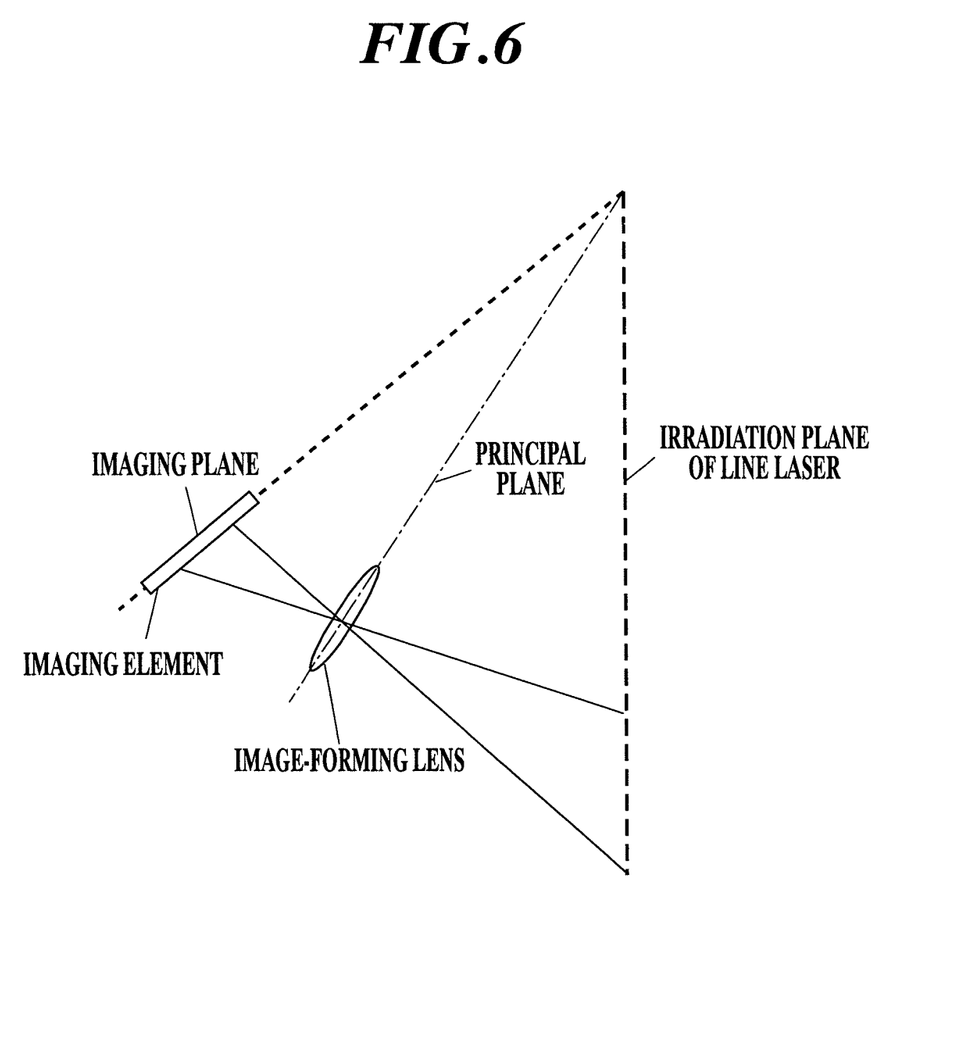
FIG. 6 is a view for explaining the Scheimpflug principle.

As shown in FIG. 6, the Scheimpflug principle refers to that, in the case where planes, which are obtained by individually extending an imaging plane of the imaging element, a principal plane including a principal point of the image-forming lens, and an irradiation plane of the line laser irradiated onto the work, are arranged so as to intersect one another at one point, the imaging plane of the imaging element entirely turns to a focusing state.

In the probe using the Scheimpflug principle as described above, measurement accuracy (resolving power) and a measurement range are in a tradeoff relationship. That is to say, in the case of measuring, by the imaging element, the work placed on the irradiation plane of the line laser, then an imaging range of the image-forming lens for use is decided by optical magnification thereof.

Figure 7:
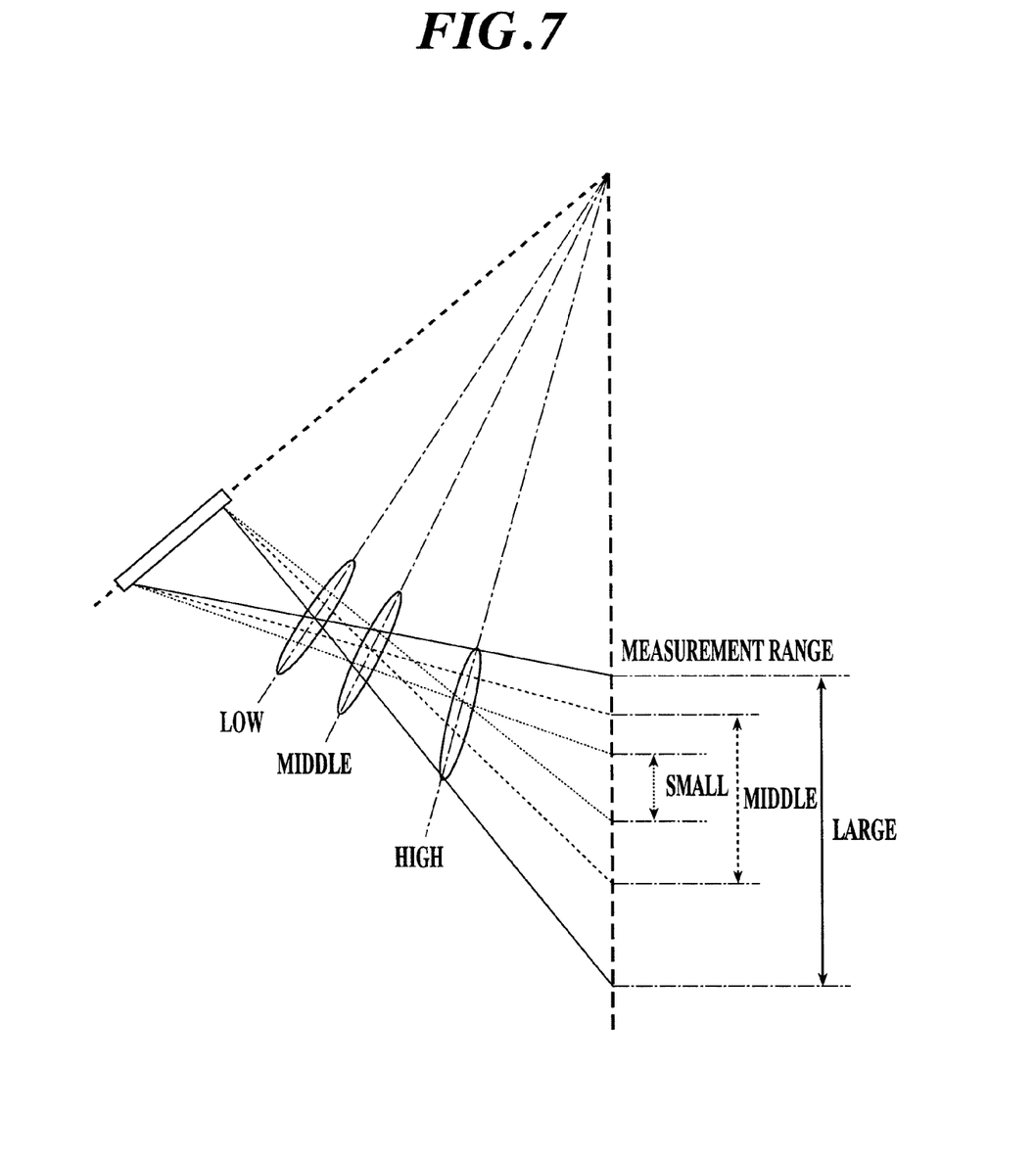
FIG. 7 is a view for explaining a relationship between measurement accuracy and a measurement range.

Therefore, as shown in FIG. 7, in the case of measuring a wide range, an image-forming lens of low magnification is used, and in the case of measuring a narrow range with high accuracy, an image-forming lens of high magnification is used.

Incidentally, heretofore, in the probe as described above, a configuration has been adopted, in which the line laser and the image-forming lens are fixed to the probe concerned in a manufacturing process, and cannot be replaced once being fixed. Therefore, the measurement accuracy and measurement range of the probe have been uniquely decided by optical magnification of the fixed image-forming lens and a size of the imaging element.

Therefore, in matching with a size of the work for which the measurement is desired to be performed, it has been necessary to switch a probe having an appropriate measurement range (or measurement accuracy), and it has been necessary to prepare plural types of probes different in specifications of the measurement range (measurement accuracy).

In order to prepare plural types of the probes only because desired measurement ranges (measurement accuracies) differ, enormous cost has occurred, and in addition, it has been necessary to perform an alignment operation and the like every time of exchanging the probe, resulting in an increase of installation man-hours.

SUMMARY OF THE INVENTION

It is an object of the present invention to provide a shape measurement device including a probe capable of adjusting and changing the measurement range and the measurement accuracy.

According to an aspect of the present invention, there is provided a shape measurement device including:

a light irradiation unit which irradiates linear light onto a work;

an imaging element which images reflected light of the light irradiated from the light irradiation unit, the reflected light being reflected by the work; and an image-forming lens which forms an image of the reflected light reflected by the work on an imaging plane of the imaging element, and a light irradiation plane of the light irradiation unit, a principal plane including a principal point of the image-forming lens, and the imaging plane of the imaging element satisfy a Scheimpflug principle, and the shape measurement device further includes:

an image obtaining region selection unit which divides the imaging plane of the imaging element into a plurality of regions, and selects, as an image obtaining region, a region for use in measurement from the plurality of regions in response to at least one of measurement accuracy and a size of a measurement range.

BRIEF DESCRIPTION OF THE DRAWINGS

The above and other objects, advantages and features of the present invention will become more fully understood from the detailed description given hereinbelow and the appended drawings and tables which are given by way of illustration only, and thus are not intended as a definition of the limits of the present invention, and wherein.

PREFERRED EMBODIMENTS OF THE INVENTION

A description is made of an embodiment of the present invention with reference to the drawings. However, the scope of the invention is not limited to the illustrated example.

First, a description is made of a configuration.

Figure 1:
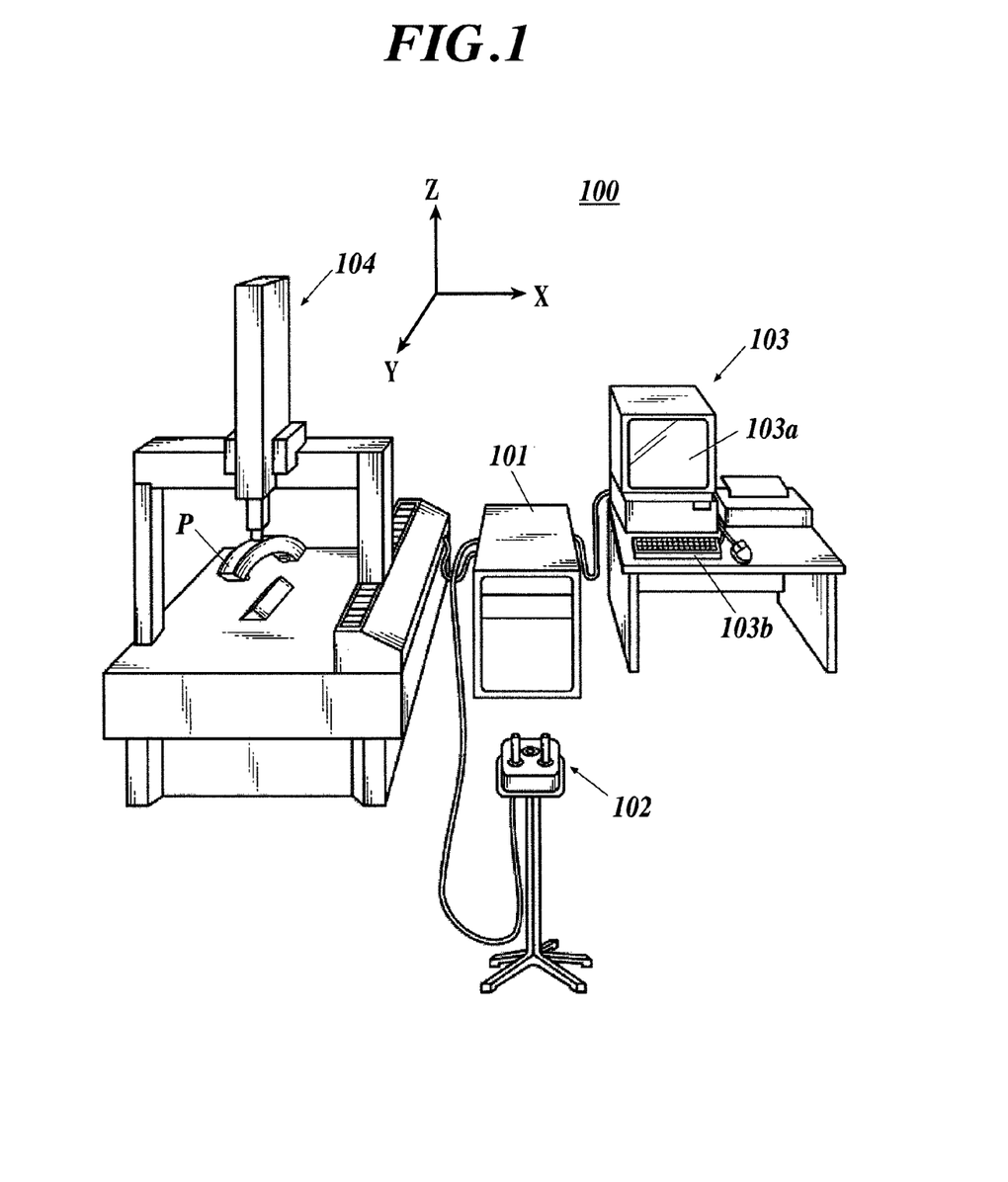
FIG. 1 is an overall configuration diagram of a shape measurement device of the present invention.

As shown in FIG. 1, a shape measurement device 100 is composed by including a control device 101; an operation unit 102; a host system 103; and a device body unit 104.

The control device 101 controls drive of the device body unit 104, and captures necessary measurement coordinate value and the like from the device body unit 104.

The operation unit 102 is used for allowing a user to manually operate the device body unit 104 through the control device 101.

The host system 103 is composed by including: a display unit 103a that displays a variety of screens; an operation unit 103b that receives an operation designation from the user; a printer unit for performing printing on a sheet; and the like.

The display unit 103a is composed, for example, of a liquid crystal display (LCD), and in accordance with an operation signal from the operation unit 103b, displays a variety of setting screens, operation statuses of respective functions, and the like on a screen. The operation unit 103b is composed, for example, of a keyboard having a variety of keys, and outputs the operation signal to the control device 101 in response to an operation by the finger and the like.

The host system 103 as described above is used as designating means, for example, in such a case where the user performs an designation operation for arbitrarily designating measurement accuracy, a size (amplitude) of a measurement range, and the like.

Moreover, the host system 103 includes functions to edit/execute a part program for designating a measurement procedure in the control device 101, to perform calculation for applying a geometric shape to the measurement coordinate value and the like, which are captured thereto through the control device 101, and to record/transmit the part program.

The device body unit 104 has a surface plate mounted on vibration removal board, and includes an optical probe P that drives in X-, Y- and Z-directions above the surface plate, and the like.

The optical probe P scans a surface of a work in a noncontact manner, and measures a surface shape of the work.

The optical probe P performs measurement by using the Scheimpflug principle, and an imaging plane of an imaging element 32 (to be described later) of an imaging unit 30 entirely turns to a focusing state.

Figure 2:
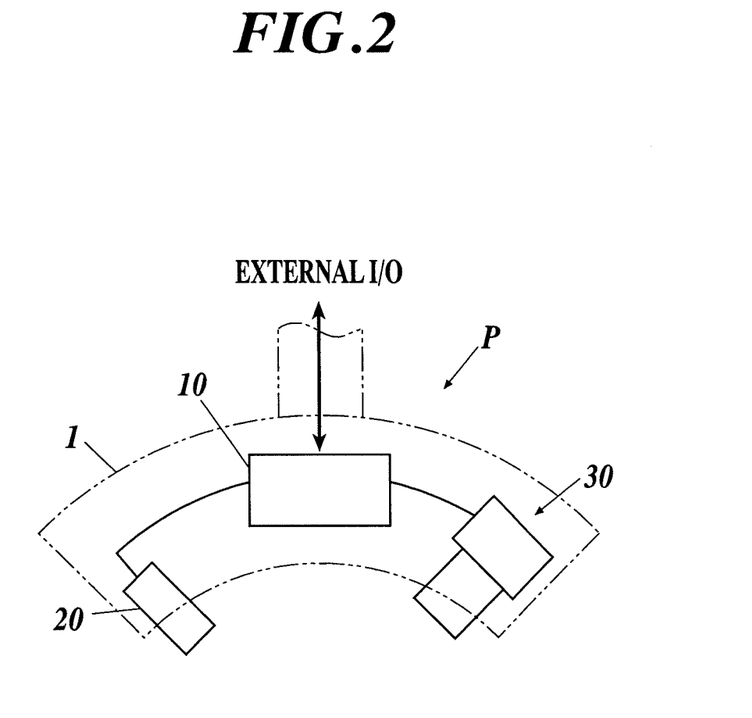
FIG. 2 is a view for explaining a configuration of an optical probe of the shape measurement device.

As shown in FIG. 2, the optical probe P is composed by including a control unit 10, a light irradiation unit 20, an imaging unit 30 and the like in a cabinet 1.

The light irradiation unit 20 is composed by including a light source, a collimator lens, a rod lens (all of which are not shown), and the like, and irradiates linear light onto the work.

Specifically, a laser beam with a predetermined wavelength, which is emitted from the light source, becomes a parallel beam by the collimator lens, and is converted into the linear light by the rod lens, and thereafter, is irradiated as the linear light onto the work. Note that it is also possible to use a cylindrical lens instead of the rod lens.

Then, when such a linear laser beam is irradiated from the light irradiation unit 20 onto the work, reflected light of the laser beam is deformed along an irregular shape of the surface of the work, and an outline when the work is cut along a certain cross section is lighted up.

The imaging unit 30 is arranged in a direction making a predetermined angle with respect to an irradiation direction of the light irradiated onto the work from the light irradiation unit 20, and receives, from the predetermined angle, the light reflected along the shape of such a work surface.

Figure 3A:
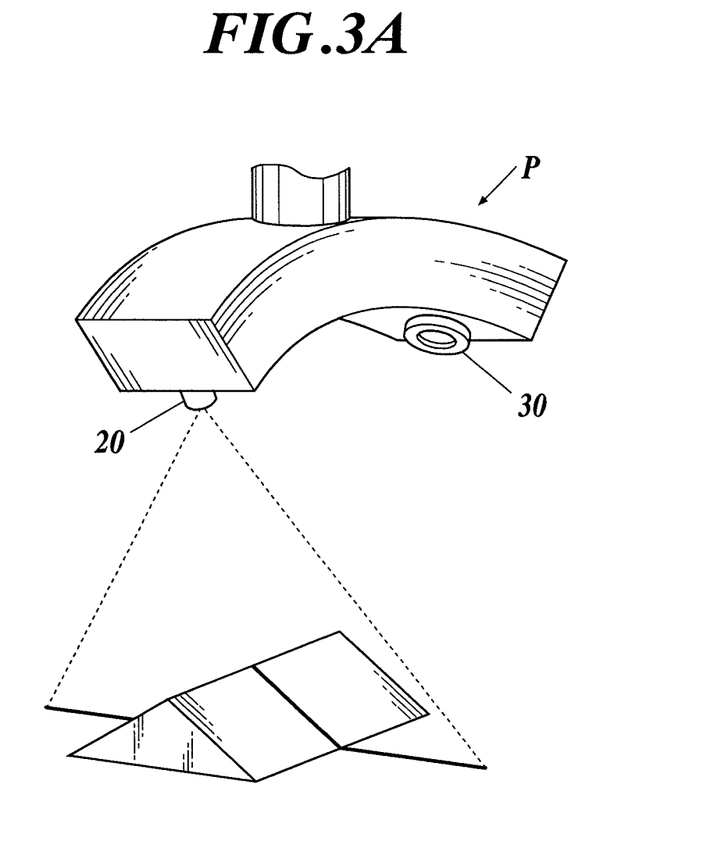
FIGS. 3A and 3B are views for explaining operations of the shape measurement device.
Figure 3B:
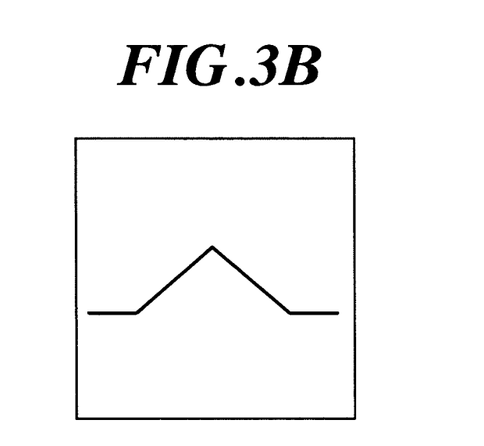

As shown in FIG. 3A, the imaging unit 30 images the work at a predetermined angle, and accordingly, as shown in FIG. 3B, an image of the reflected light of the laser beam, which goes along the surface shape of the work, is imaged.

Figure 4:
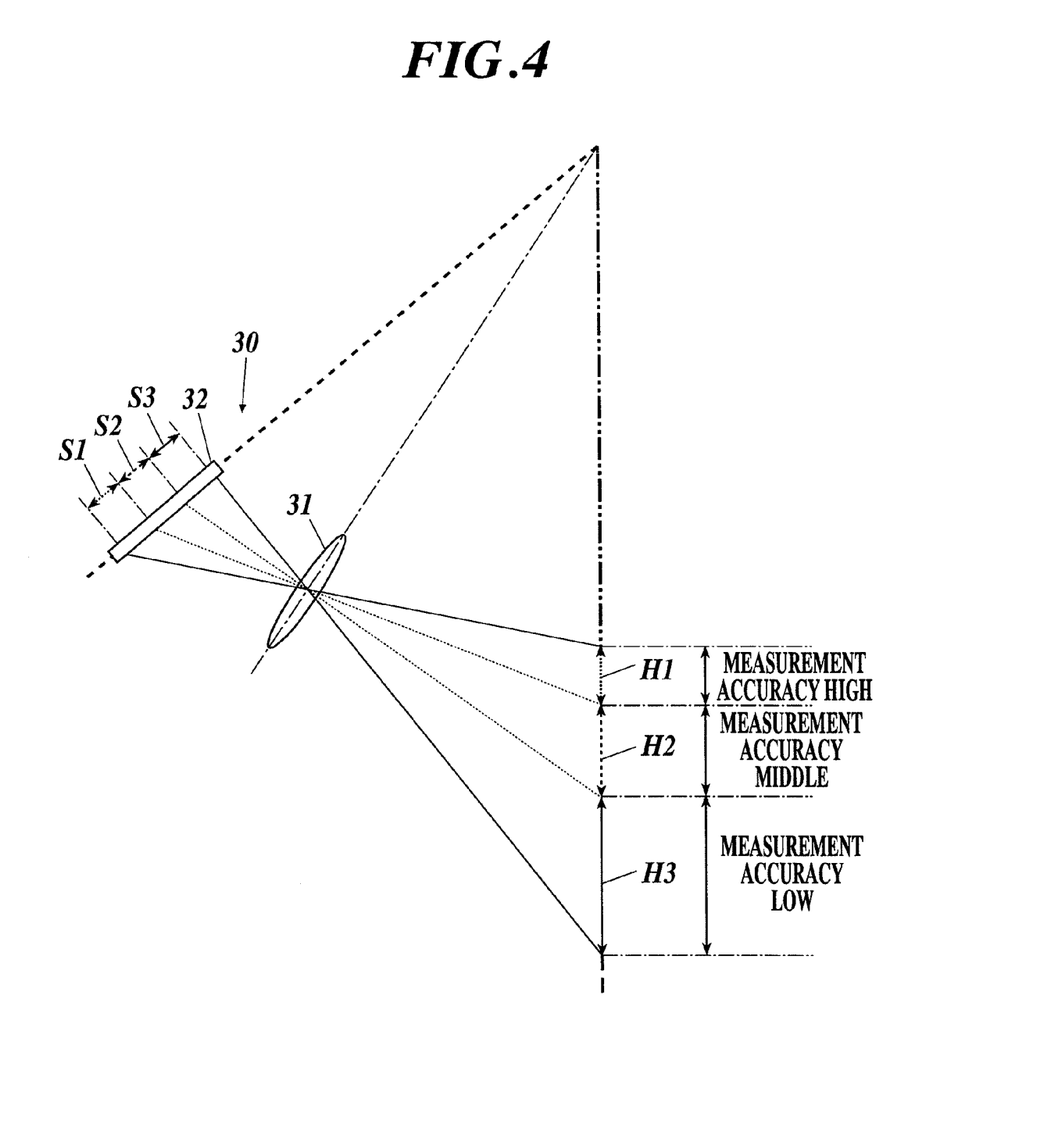
FIG. 4 is a view for explaining an imaging unit.

Specifically, as shown in FIG. 4, the imaging unit 30 is composed by including an image-forming lens 31; the imaging element 32; and the like.

Note that FIG. 4 is a conceptual view showing an optical positional relationship between the image-forming lens 31 and the imaging element 32. A broken line in FIG. 4 indicates the imaging plane of the imaging element 32, and an alternate long and short dash line indicates a principal plane including a principal point of the image-forming lens 31. Moreover, a chain double-dashed line indicates an irradiation plane of the light irradiation unit 20, from which the laser beam is irradiated onto the work.

The image-forming lens 31 forms the image of the reflected light, which comes from the work, on the imaging plane of the imaging element 32.

As the image-forming lens 31, a lens with any optical magnification is usable; however, an image-forming lens with lower magnification is preferable since a wider range can be taken as a measurable range.

The imaging element 32 includes an image sensor (not shown) that images an image of the work (that is, the reflected light from the work) through the image-forming lens 31.

The image sensor is composed by including CMOS light receiving elements, for example, in a matrix of 1024 pixels× 1280 pixels, which are individually arrayed in two directions perpendicular to each other.

The image sensor has a so-called rolling shutter function to allow only the light receiving elements arranged in one or plural rows (or columns) to simultaneously receive the light, and to sequentially perform such light reception per row (or per column) in a column direction (or in a row direction).

With regard to the imaging element 32, by control of the control unit 10 (to be described later), a part of the imaging plane thereof is selected as an image obtaining region, and only pixels of the image obtaining region concerned are read out and used.

Figure 5:
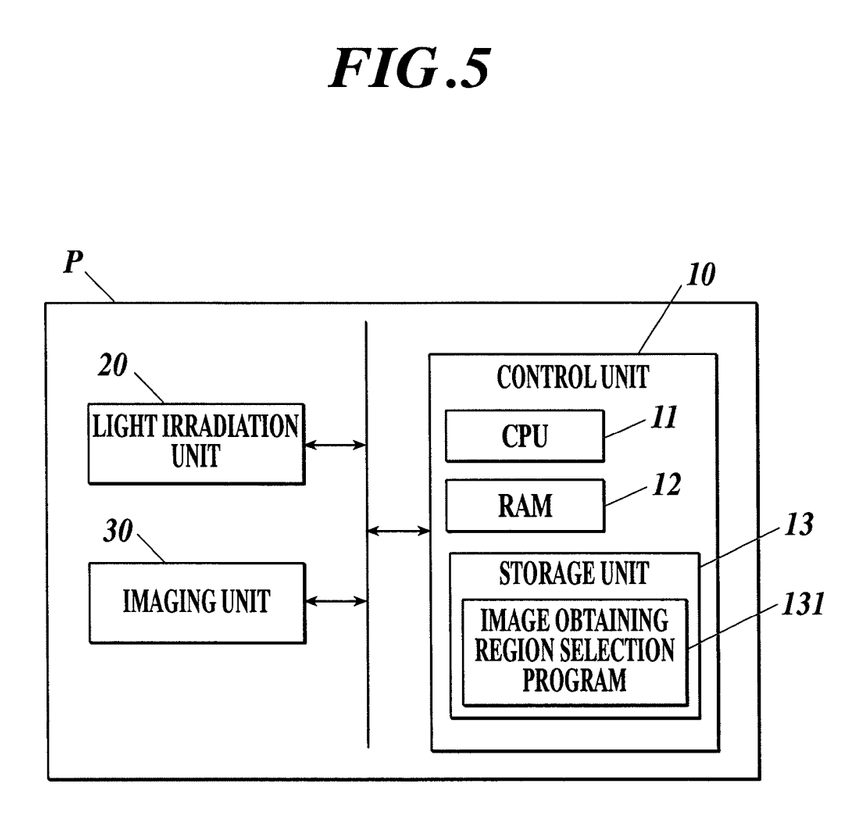
FIG. 5 is a block diagram showing a control configuration for the optical probe.

As shown in FIG. 5, the control unit 10 is composed by including: a central processing unit (CPU) 11; a random access memory (RAM) 12; a storage unit 13; and the like, and performs centralized control for the operations of light irradiation unit 20 and the imaging unit 30.

The CPU 11 performs various pieces of control processing, for example, in accordance with a variety of processing programs stored in the storage unit 13.

The RAM 12 forms a work memory area that stores therein data subjected to arithmetic operation processing by the CPU 11.

For example, the storage unit 13 stores a system program executable by the CPU 11, the variety of processing programs executable by the system program concerned, data for use in the event of executing the variety of processing programs, data of a variety of processing results subjected to the arithmetic operation processing by the CPU 11, and the like. Note that the programs are stored in the storage unit 13 in a form of program codes readable by a computer.

Specifically, in the storage unit 13, for example, an image obtaining region selection program 131 and the like are stored.

The image obtaining region selection program 131 is a program, for example, that allows the CPU 11 to divide the imaging plane of the imaging element 32 into a plurality of regions, and to select a region for use in the measurement as the image obtaining region from the plurality of divided regions in response to the measurement accuracy and/or the size of the measurement range.

Specifically, as shown in FIG. 4, the CPU 11 divides the imaging plane (effective imaging region) of the imaging element 32 into the plurality of regions and recognizes the divided regions in response to the preset number of divisions. Therefore, the measurement range is also set for each of the divided regions.

FIG. 4 shows a state where the imaging plane of the imaging element 32 is divided into three regions S1, S2 and S3. In this case, the measurement range is divided into a measurement range H1 corresponding to the region S1, a measurement range H2 corresponding to the region S2, and a measurement range H3 corresponding to the region S3. Note that high-accuracy measurement is possible in order of S1>S2>S3 (H1>H2>H3) based on characteristics of a Scheimpflug optical system.

Then, when the user performs, by using the host system 103, the designation operation for designating the CPU 11 executes the image obtaining region selection program 131, and selects the image obtaining region from the three regions S1, S2 and S3 in response to the designation operation.

For example, in the case of designating the measurement accuracy as "high", the region S1 is selected as the image obtaining region.

Moreover, in the case of designating the measurement accuracy as "high" and designating the measurement range as "wide", the region S2 is selected as the image obtaining region.

Furthermore, in the case of designating the measurement range as "wide", the region S3 is selected as the image obtaining region.

Specifically, in response to the designation of the user, the CPU 11 selects the measurement accuracy at which the measurement range is to be measured, and selects the size of the measurement range to be measured.

The CPU 11 executes the image obtaining region selection program 131 as described above, thereby functioning as image obtaining region selecting means.

Next, a description is made of functions.

In this embodiment, as described above, for example, in the case where the measurement is desired to be performed with high accuracy, the measurement is performed in such a range with high optical magnification by using the region S1 in the imaging plane of the imaging element 32, and accordingly, the high accuracy measurement is possible.

Moreover, for example, in the case where the measurement is desired to be performed in the wide measurement range, the measurement is performed in such a range with low optical magnification by using the region S3 in the imaging plane of the imaging element 32, and accordingly, the wide range measurement is possible.

As described above, even if the image-forming lens 31 (optical probe P) is not exchanged, the measurement can be performed in an appropriate measurement range (or measurement accuracy).

Moreover, in the imaging element 32, in the case of performing such partial readout as described above, which uses only one region of the imaging plane of the imaging element 32, a frame rate can be enhanced in comparison with the case of reading out all pixels, and accordingly, it is possible to realize high-speed scanning.

Hence, the high-speed scanning can be realized by using an available imaging element known in public.

As described above, in accordance with this embodiment, when the user designates the measurement accuracy and/or the size of the measurement range, the control unit 10 divides the imaging plane of the imaging element 32 into the plurality of regions (S1 to S3), and selects the image obtaining region for use in the measurement in response to the designated measurement accuracy and/or size of the measurement range.

Therefore, the measurement range and the measurement accuracy can be adjusted/changed without replacing the image-forming lens 31.

Hence, it is unnecessary to prepare plural types of the optical probes different in specifications of the measurement range and the measurement accuracy, and cost is reduced. Moreover, it is unnecessary to perform exchange work for the optical probe, and the like, and accordingly, reduction of installation man-hours can be achieved. Furthermore, the high-speed scanning that has been heretofore achieved can be maintained.

Hence, usability of the shape measurement device can be enhanced.

Note that, in the above-described embodiment, such a configuration has been illustrated, in which the imaging plane of the imaging element 32 is divided into the three regions S1 to S3, and the divided regions are recognized; however, the number of divisions is not limited to this, and just needs to be two or more. Moreover, the imaging plane may be divided into the regions so that the regions can overlap one another.

Moreover, in the above-described embodiment, such a configuration has been illustrated, in which the user designates the measurement accuracy and the measurement range; however, a function may be mounted, which is to automatically decide the measurement accuracy and the measurement range in response to the shape of the work. In this case, for example, irregularities and the like of the work are recognized based on CAD data read in advance, and the measurement accuracy and the measurement range are decided.

According to a preferred embodiment of the present invention, there is provided a shape measurement device including:

a light irradiation unit which irradiates linear light onto a work;

an imaging element which images reflected light of the light irradiated from the light irradiation unit, the reflected light being reflected by the work; and an image-forming lens which forms an image of the reflected light reflected by the work on an imaging plane of the imaging element, and a light irradiation plane of the light irradiation unit, a principal plane including a principal point of the image-forming lens, and the imaging plane of the imaging element satisfy a Scheimpflug principle, and the shape measurement device further includes:

an image obtaining region selection unit which divides the imaging plane of the imaging element into a plurality of regions, and selects, as an image obtaining region, a region for use in measurement from the plurality of regions in response to at least one of measurement accuracy and a size of a measurement range.

Preferably, the shape measurement device further includes:

a designation unit which designates at least one of the measurement accuracy and the size of the measurement range.

The embodiment disclosed this time should be considered in all respects to be illustrative but not to be restrictive. The scope of the present invention is not shown by the above description, but by claims, and is intended to include the equivalents to claims and all modifications within the scope of claims.

What is claimed is:

1. A shape measurement device comprising:
 a light irradiation unit which irradiates linear light onto a work;
 an imaging element which images reflected light of the light irradiated from the light irradiation unit, the reflected light being reflected by the work; and
 an image-forming lens which forms an image of the reflected light reflected by the work on an imaging plane of the imaging element, wherein a light irradiation plane of the light irradiation unit, a principal plane including a principal point of the image-forming lens, and the imaging plane of the imaging element satisfy a Scheimpflug principle, wherein the shape measurement device further comprises:

an image obtaining region selection unit which divides the imaging plane of the imaging element into a plurality of regions, and selects, as an image obtaining region, a region for use in measurement from the plurality of regions in response to at least one of measurement accuracy and a size of a measurement range.

2. The shape measurement device according to claim 1, further comprising:

a designation unit which designates at least one of the measurement accuracy and the size of the measurement range.

* * * * *